(12) United States Patent
Roccon

(10) Patent No.: US 9,120,966 B2
(45) Date of Patent: Sep. 1, 2015

(54) PROCESS FOR DISINFECTING AND STABILIZING PRODUCTION WATER USING IN-SITU HYPOBROMOUS ACID GENERATION

(71) Applicant: Raymond J Roccon, Cranberry Township, PA (US)

(72) Inventor: Raymond J Roccon, Cranberry Township, PA (US)

(*) Notice: Subject to any disclaimer, the term of this patent is extended or adjusted under 35 U.S.C. 154(b) by 194 days.

(21) Appl. No.: 13/934,252

(22) Filed: Jul. 3, 2013

(65) Prior Publication Data

US 2014/0011716 A1  Jan. 9, 2014

Related U.S. Application Data

(60) Provisional application No. 61/667,601, filed on Jul. 3, 2012.

(51) Int. Cl.
| | |
|---|---|
| *C09K 8/74* | (2006.01) |
| *E21B 43/26* | (2006.01) |
| *C09K 8/60* | (2006.01) |
| *C09K 8/66* | (2006.01) |

(52) U.S. Cl.
CPC .. *C09K 8/605* (2013.01); *C09K 8/66* (2013.01)

(58) Field of Classification Search
CPC ...... C09K 8/528; C09K 8/605; Y10S 507/92; Y10S 507/922

USPC ........................................ 507/269; 166/308.1
See application file for complete search history.

(56) References Cited

U.S. PATENT DOCUMENTS

| | | | |
|---|---|---|---|
| 5,015,643 A | 5/1991 | Jones et al. | |
| 5,464,636 A | 11/1995 | Hight et al. | |
| 5,476,670 A | 12/1995 | Hight et al. | |
| 5,527,547 A | 6/1996 | Hight et al. | |
| 5,543,388 A * | 8/1996 | Williams et al. | 507/269 |
| 5,662,940 A | 9/1997 | Hight et al. | |
| 6,927,237 B2 | 8/2005 | Hei et al. | |
| 7,531,080 B2 | 5/2009 | Carson et al. | |
| 2006/0182816 A1 | 8/2006 | Shane et al. | |
| 2011/0287984 A1 * | 11/2011 | Mirakyan et al. | 507/225 |

* cited by examiner

*Primary Examiner* — Aiqun Li
(74) *Attorney, Agent, or Firm* — Blynn L. Shideler; Krisanne Shideler; BLK Law Group

(57) ABSTRACT

A method of reusing waste-water resulting from hydrocarbon production operations as a disinfectant. The method includes a) providing waste-water resulting from hydrocarbon production operations containing greater than 3 ppm bromide ion; b) adjusting the pH of the waste-water to a pH that renders the fracturing fluid non-scaling, while maximizing the production of hypobromous acid and c) adding a sufficient amount of an oxidizing agent to convert the bromide ion to hypobromous acid to provide a disinfectant solution.

20 Claims, No Drawings

PROCESS FOR DISINFECTING AND STABILIZING PRODUCTION WATER USING IN-SITU HYPOBROMOUS ACID GENERATION

CROSS-REFERENCE TO RELATED APPLICATION

This application claims the benefit of U.S. Provisional Patent Application Ser. No. 61/667,601, filed: Jul. 3, 2012, and entitled "Process for Disinfecting and Stabilizing Production Water using In-situ Hypobromous Acid Generation," which is herein incorporated by reference.

BACKGROUND OF THE INVENTION

1. Field of the Invention

The present invention relates to methods of disinfecting and stabilizing water produced from hydrocarbon production operations.

2. Description of the Prior Art

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

One example of a treatment fluid are viscous gelled fracturing fluids commonly utilized in the hydraulic fracturing of subterranean zones penetrated by well bores to increase the production of hydrocarbons from the subterranean zones. That is, a viscous fracturing fluid is pumped through the well bore into a subterranean zone to be stimulated at a rate and pressure such that fractures are formed and extended into the subterranean zone. The fracturing fluid also carries particulate proppant material, e.g., graded sand, into the formed fractures. The proppant material is suspended in the viscous fracturing fluid so that the proppant material is deposited in the fractures when the viscous fracturing fluid is broken and recovered. The proppant material functions to prevent the fractures from closing whereby conductive channels are formed through which produced fluids can flow to the well bore.

An example of a stimulation operation utilizing an aqueous treatment fluid is hydraulic fracturing. In some instances, a fracturing treatment involves pumping a proppant-free, aqueous treatment fluid (known as a pad fluid) into a subterranean formation faster than the fluid can escape into the formation so that the pressure in the formation rises and the formation breaks, creating or enhancing one or more fractures. Enhancing a fracture includes enlarging a pre-existing fracture in the formation. Once the fracture is formed or enhanced, proppant particulates are generally placed into the fracture to form a proppant pack that may prevent the fracture from closing when the hydraulic pressure is released, forming conductive channels through which fluids may flow to the well bore.

In many cases, soluble salts from down-hole formations dissolve into the fluids used in the hydraulic fracturing process and are returned to the surface in the form of produced and flowback waters. These waters are considered waste-water that are typically disposed of through chemical or thermal treatment or injection into disposal wells. However, due to government regulation and the volume of waste-water produced, it is becoming more difficult to properly dispose of waste-water resulting from hydrocarbon production operations.

There is a need in the art to provide alternative uses for the waste-water resulting from hydrocarbon production operations in order to avoid the need to dispose of it.

SUMMARY OF THE INVENTION

The present invention provides a method of reusing waste-water resulting from hydrocarbon production operations as a disinfectant. The method includes a) providing waste-water resulting from hydrocarbon production operations containing greater than 3 ppm bromide ion; b) adjusting the pH of the waste-water to less than 8.5; and c) adding a sufficient amount of an oxidizing agent to convert the bromide ion to hypobromous acid to provide a disinfectant solution.

The present invention is also directed to a method of reusing waste-water resulting from hydrocarbon production operations as a disinfectant that includes a) providing waste-water resulting from hydrocarbon production operations containing greater than 3 ppm bromide ion; b) adjusting the pH of the waste-water to less than 8.5; c) adding a sufficient amount of an oxidizing agent to convert the bromide ion to hypobromous acid to provide a disinfectant solution; d) blending the disinfectant solution with other water to provide a fracturing fluid comprising at least 5 ppm bromide; e) adjusting the pH of the blended water to a range that prevents the formation of scale-forming salts; f) maintaining a free bromine level is at least 0.1 ppm.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present invention provides alternative uses for the waste-water resulting from hydrocarbon production operations in order to avoid the need to dispose of such waste-water; and more directly to methods of disinfecting and stabilizing water produced from hydrocarbon production operations. Thus, in many respects, the invention provides methods of reusing salt-laden waste-water from hydrocarbon production operations as a halogen source for disinfecting fluids used in subsequent hydraulic fracturing operations, by in-situ halogen generation from the bromide salt as well as methods of maximizing the conversion of bromide salt into disinfectant by adjusting the pH downward to a pH that has been calculated to make the total fluid non-scaling.

In embodiments of the invention, the waste-water resulting from hydrocarbon production operations an contain various heavy metals, polymers and other additives removed from down hole formations or otherwise used in hydrocarbon production operations. In this embodiment other methods known in the art can be used to remove certain materials from the waste-water.

In the present method, waste-water resulting from hydrocarbon production operations is reused as a disinfectant. The method broadly includes the steps of providing waste-water resulting from hydrocarbon production operations containing greater than 3 ppm bromide ion; adjusting the pH of the waste-water to less than 8.5; and adding a sufficient amount of an oxidizing agent to convert the bromide ion to hypobromous acid to provide a disinfectant solution.

Typically, the waste-water resulting from hydrocarbon production operations contain moderate to high levels of bromide ion. The amount of bromide ion in the waste-water that can be used in the invention can vary, but is typically at least 3 ppm. In embodiments of the invention, the amount of bromide ion in the waste-water can be at least 5 ppm, in some cases at least 6 ppm, in some instances at least 8 ppm and in other instances at least 10 ppm and can be up to 10,000 ppm, in some cases up to 7,500 ppm, in other cases up to 5,000 ppm, in some instances up to 2,500 ppm and in other instances up to 1,000 ppm. The amount of bromide ion in the waste-water used in the invention can be any value or range between any of the values recited above. The particular amount of bromide ion that can be present in the waste-water will depend on the other constituents in the waste-water and processing parameters described herein.

In the present invention, bromide ion is oxidized to form hypobromous acid, which is a strong disinfectant. The oxidation of bromide ion can be accomplished using any suitable oxidizing agent. Suitable oxidizing agents include, but are not limited to one or more of ozone, chlorine gas, sodium hypochlorite, dichloro isocyanuranate, and trichloroisocyanuric acid.

In embodiments of the invention, the oxidizing agent can increase the pH of the waste-water, which can cause the conversion of bromide to hypobromous acid to be less efficient. Thus, in these embodiments of the invention, a suitable acid is used to lower the pH of the waste-water to promote the conversion of bromide to hypobromous acid. Any suitable acid can be used to lower the pH. In many cases it is desirable to use an inorganic acid to lower the pH of the waste-water. In particular embodiments of the invention, hydrochloric acid is used to lower the pH of the waste-water.

In embodiments of the invention, the pH of the waste-water is adjusted to 8.5 or less, in some cases 8.0 or less, in other cases 7.5 or less, in some instances 7 or less, in other instances 6.5 or less and in some situations 6 or less. The pH is adjusted to a level that maximizes the conversion of bromide to hypobromous acid and minimizes the formation of scale forming salts.

In embodiments of the invention, the addition of oxidizing agent and acid for pH control are independently or simultaneously added to the waste-water or the wasterwater/makeup water blend which can constitute a fracturing fluid As used herein the term "scale forming salts" refers to salts of divalent or multivalent metals, including but not limited to calcium, magnesium and iron, that tend to precipitate onto surfaces when present at elevated concentrations in the waste-water and at pH levels that promote precipitation. Scale forming salts include, but are not limited to one or more carbonate, sulfate, phosphate, silicate, oxide and/or hydroxide salts of calcium, magnesium, iron, barium, strontium, and/or radium.

Subsequently, waste-water resulting from hydrocarbon production operations can be analyzed and then blended with other water sources to form a blended water, which can be fracturing fluid. The blended water is typically blended to have a bromide ion concentration of at least 3 ppm. In embodiments of the invention, the amount of bromide ion in the blended water used in the invention can vary, but can be at least 5 ppm, often at least 6 ppm, in some cases at least 7 ppm, in some instances at least 9 ppm and in other instances at least 10 ppm and can be up to 10,000 ppm, in some cases up to 7,500 ppm, in other cases up to 5,000 ppm, in some instances up to 2,500 ppm and in other instances up to 1,000 ppm. The amount of bromide ion in the blended water of the invention can be any value or range between any of the values recited above.

In embodiments of the invention, analysis of the blended water can predict the correct pH to minimize the tendency of scale forming salts to precipitate from the blended water.

In embodiments of the invention, an oxidizing agent and a pH adjusting acid as disclosed above can be added separately to the blended water. Alternatively, an oxidizing agent and a pH adjusting acid can be added simultaneously using in process control equipment known in the art. As disclosed above, the oxidizing agent and pH are adjusted to maximize the formation of hypobromous acid and to minimize the formation of scale forming salts.

In embodiments of the invention, testing and control of pH and oxidizing agent can be automated. Alternatively, commercially available test kits can be used to allow an operator use breakpoint bromination techniques. In other words, testing can be conducted for both free and total chlorine/bromine. Once all of the halogen demand of the blended water is satisfied, free residual chlorine/bromide can be detected in the blend water.

In embodiments of the invention, the blend water will contain at least 0.1 ppm, in some cases at least 0.2 ppm, in other cases at least 0.5 ppm, in other cases at least 1 ppm, in some instances at least 2 ppm, in other instances at least 5, in some situations at least 7.5 ppm, and in other situations at least 10 ppm free residual bromine. The amount of free residual bromine will be an amount sufficient to disinfect the particular blended water.

In embodiments of the invention, the present methods can be automated using real-time probes that are in communication with monitoring and control equipment known in the art to monitor and control the feed rates of pH adjusting acid and oxidizing agent to automatically adjust to changes in the composition of blend water.

The methods according to the invention provide numerous advantages. As a non-limiting example, the blend water costs less than a freshly formulated fracturing fluid because it utilizes the formed hypobromous acid instead of expensive specialty biocides. Further, the readily available monitoring and control techniques described above provide for improved feed control, lower volumes of chemicals, and less manpower to obtain desired results and lower overall processing costs. The fact that no additional bromide is added to the blend water in the disinfection process provides a particular cost savings. Additionally, rather than using separate monitoring and control operations, disinfection and scale control are combined in one step.

EXAMPLES

To more clearly illustrate the present invention, the following example is presented below. This example is intended to be illustrative and no limitations to the present invention should be drawn or inferred from the examples presented herein.

Example 1

Marcellus production wastewater is obtained from a hydraulic fracturing operation containing 300 mg/l barium, 110 mg/l bromide, 890 mg/l calcium, 75 mg/l lithium, 456 mg/l magnesium, 40,000 mg/l sodium, 480 mg/l bicarbonate 65,000 mg/l chloride and 650 mg/l strontium. This production water is blended 20:80 with fresh water to provide blended water containing 22 mg/l bromide ion. The blended water is then evaluated using an index that predicts scale formation potential. If the blended water exhibits calcite scaling tendencies, hydrochloric acid is added to the wastewater to adjust the pH to the point where the predictive index shows the pH adjusted blended water to be non-scaling or slightly scale dissolving with regard to calcite. Sodium hypochlorite (oxidizing agent) is then added to the pH adjusted blended water, converting the bromide ion to hypobromous acid at levels adequate to disinfect the full volume of blended water. Because of the dissociation relationship of bromine to hypobromous acid and hypobromite ion, lowering of the fluid pH to prevent calcite scaling has the additional benefit of favoring the formation of hypobromous acid as compared to hypobromite ion, where hypobromous acid is acknowledged as a superior biological disinfectant. This blended water is used as the base fluid for performing a subsequent hydraulic fracturing operation. Utilization of bromide present in produced water to form the fracturing fluid disinfectant while adjusting pH to minimize calcite scale significantly reduces the cost of fracturing fluid disinfection and scale prevention, does not add additional bromide ion to the water table and prevents biological inoculation of the well.

The present invention has been described with reference to specific details of particular embodiments thereof. It is not intended that such details be regarded as limitations upon the scope of the invention except insofar as and to the extent that they are included in the accompanying claims.

I claim:

1. A method of reusing waste-water resulting from hydrocarbon production operations as a disinfectant comprising:
    a) providing waste-water resulting from hydrocarbon production operations containing greater than 3 ppm bromide ion;
    b) adjusting the pH of the waste-water with an acid to less than 8.5; and
    c) adding a sufficient amount of an oxidizing agent that is different from the acid used in step b) to convert the bromide ion to hypobromous acid to provide a disinfectant solution.

2. The method according to claim 1, wherein the oxidizing agent is one or more selected from the group consisting of ozone, chlorine gas, sodium hypochlorite, dichloro isocyanuranate, and trichloroisocyanuric acid.

3. The method according to claim 1, wherein the pH is adjusted to less than 7.5.

4. The method according to claim 1, wherein the pH is adjusted to less than 7.

5. The method according to claim 1, wherein the pH is adjusted using hydrochloric acid.

6. The method according to claim 1, wherein the disinfectant solution is blended with other water to provide a fracturing fluid comprising at least 3 ppm bromide.

7. The method according to claim 6, wherein the pH of the blended water is in a range that minimizes the formation of scale-forming salts.

8. The method according to claim 6, wherein the free bromine level of the blended water is at least 0.1 ppm.

9. A method of reusing waste-water resulting from hydrocarbon production operations as a disinfectant comprising:
    a) providing waste-water resulting from hydrocarbon production operations containing greater than 3 ppm bromide ion;
    b) adjusting the pH of the waste-water to less than 7.5;
    c) adding a sufficient amount of an oxidizing agent to convert the bromide ion to hypobromous acid to provide a disinfectant solution;
    d) blending the disinfectant solution with other water to provide blended water in a fracturing fluid comprising at least 3 ppm bromide;
    e) adjusting the pH of the blended water to a range that prevents the formation of scale-forming salts;
    f) maintaining a free bromine level of the blended water of at least 0.1 ppm.

10. The method according to claim 9, wherein the oxidizing agent is one or more selected from the group consisting of ozone, chlorine gas, sodium hypochlorite, dichloro isocyanuranate, and trichloroisocyanuric acid.

11. The method according to claim 9, wherein the pH is adjusted to less than 7.

12. The method according to claim 9, wherein acid is added to adjust the pH of the waste-water and an oxidizing agent which is different from the acid used to adjust the pH is added simultaneously to the waste-water.

13. The method according to claim 9, wherein the pH is adjusted using hydrochloric acid.

14. The method according to claim 9, wherein the pH of the blended water is in a range that minimizes the formation of scale-forming salts.

15. A method of reusing waste-water resulting from hydrocarbon production operations as a disinfectant comprising:
    a) providing waste-water resulting from hydrocarbon production operations containing greater than 5 ppm bromide ion;
    b) adjusting the pH of the waste-water to less than 8 with an acid;
    c) adding a sufficient amount of an oxidizing agent distinct from the acid of step b) to convert the bromide ion to hypobromous acid to provide a disinfectant solution; and
    d) blending the disinfectant solution with other water to provide blended water in a fracturing fluid comprising at least 1 ppm bromide.

16. The method according to claim 15, further comprising the step of e) adjusting the pH of the blended water to a range that prevents the formation of scale-forming salts.

17. The method according to claim 16 further comprising the step of f) maintaining a free bromine level in the blended water of at least 2 ppm.

18. The method according to claim 15 wherein the pH of the waste-water is adjusted using hydrochloric acid.

19. The method according to claim 18, wherein the blending of the disinfectant solution with the other water provides blended water in a fracturing fluid comprising at least 5 ppm bromide.

20. The method according to claim 19, further comprising the step of e) adjusting the pH of the blended water to a range that prevents the formation of scale-forming salts.

\* \* \* \* \*